United States Patent
Miller et al.

(10) Patent No.: US 7,797,727 B1
(45) Date of Patent: Sep. 14, 2010

(54) LAUNCHING AN APPLICATION IN A RESTRICTED USER ACCOUNT

(75) Inventors: Mark S. Miller, Cupertino, CA (US); Marc D. Stiegler, Kingman, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1333 days.

(21) Appl. No.: 11/047,015

(22) Filed: Jan. 31, 2005

(51) Int. Cl.
*G06F 17/00* (2006.01)

(52) U.S. Cl. ......................................................... 726/1
(58) Field of Classification Search .................. 726/1
See application file for complete search history.

(56) References Cited

U.S. PATENT DOCUMENTS

| | | | | |
|---|---|---|---|---|
| 6,047,312 A | * | 4/2000 | Brooks et al. ............... | 709/203 |
| 6,289,462 B1 | * | 9/2001 | McNabb et al. ............... | 726/21 |
| 6,629,109 B1 | * | 9/2003 | Koshisaka ................... | 707/203 |
| 7,069,275 B2 | * | 6/2006 | Salmen ........................ | 707/200 |
| 7,231,640 B2 | * | 6/2007 | Evans et al. ................. | 719/310 |
| 7,275,264 B2 | * | 9/2007 | Cuenod et al. ................ | 726/29 |
| 2003/0061504 A1 | | 3/2003 | Sprigg et al. | |

OTHER PUBLICATIONS

Stiegler, M. et al., "A Capability Based Client: The DarpaBrowser", Combex Inc., Jun. 26, 2002.

* cited by examiner

*Primary Examiner*—Kambiz Zand
*Assistant Examiner*—Amare Tabor

(57) ABSTRACT

An original identifier of an application in a computer system is changed to a new identifier. An attempt is made, using the original identifier, to run the application. In response to the attempt, the application is then launched in a restricted user account on the computer system using the new identifier.

17 Claims, 10 Drawing Sheets

500

CHANGE AN ORIGINAL IDENTIFIER OF AN APPLICATION TO A NEW IDENTIFIER
502

RUN THE APPLICATION IN A RESTRICTED USER ACCOUNT USING THE NEW IDENTIFIER OF THE APPLICATION IN RESPONSE TO AN ATTEMPT TO RUN THE APPLICATION USING THE ORIGINAL IDENTIFIER
504

*FIG. 5*

LAUNCHING AN APPLICATION IN A RESTRICTED USER ACCOUNT

BACKGROUND

In the past few years, computer viruses have caused damage to computer systems throughout the world. A computer virus is a program capable of operation on a computer system, such as a personal computer, that is self-replicating and that can "infect" other programs by modifying them or their environment such that a call to an infected program results in an action that the user may not like.

Computer systems today typically run operating systems having user accounts for users of the systems. A user logs into the computer system under a user account and has authority to add, edit, delete or use most of the resources available in the computer system. Additionally, applications running in the user's account have the same authority as the user. This arrangement presents a computer virus with a doorway to most of the resources in the computer system. For instance, if an application is infected by a virus, the virus is able to spread to any resource that the application may access including other files located on the computer system. Conventional virus detection software is often unable to stop the spread of viruses, as exemplified by periodic outbreaks of computer virus infections.

SUMMARY

According to an embodiment, a method includes changing an original identifier of an application in a computer system to a new identifier. An attempt is made, using the original identifier, to run the application. In response to the attempt, the application is then launched in a restricted user account on the computer system using the new identifier.

BRIEF DESCRIPTION OF THE DRAWINGS

Embodiments of the invention are illustrated by way of example and without limitation in the accompanying figures in which like numeral references refer to like elements, and wherein:

FIG. 5 shows a flow diagram of an operational mode of a system for launching an application in a restricted user account in accordance with an embodiment of the invention;

DETAILED DESCRIPTION

Figure 1:
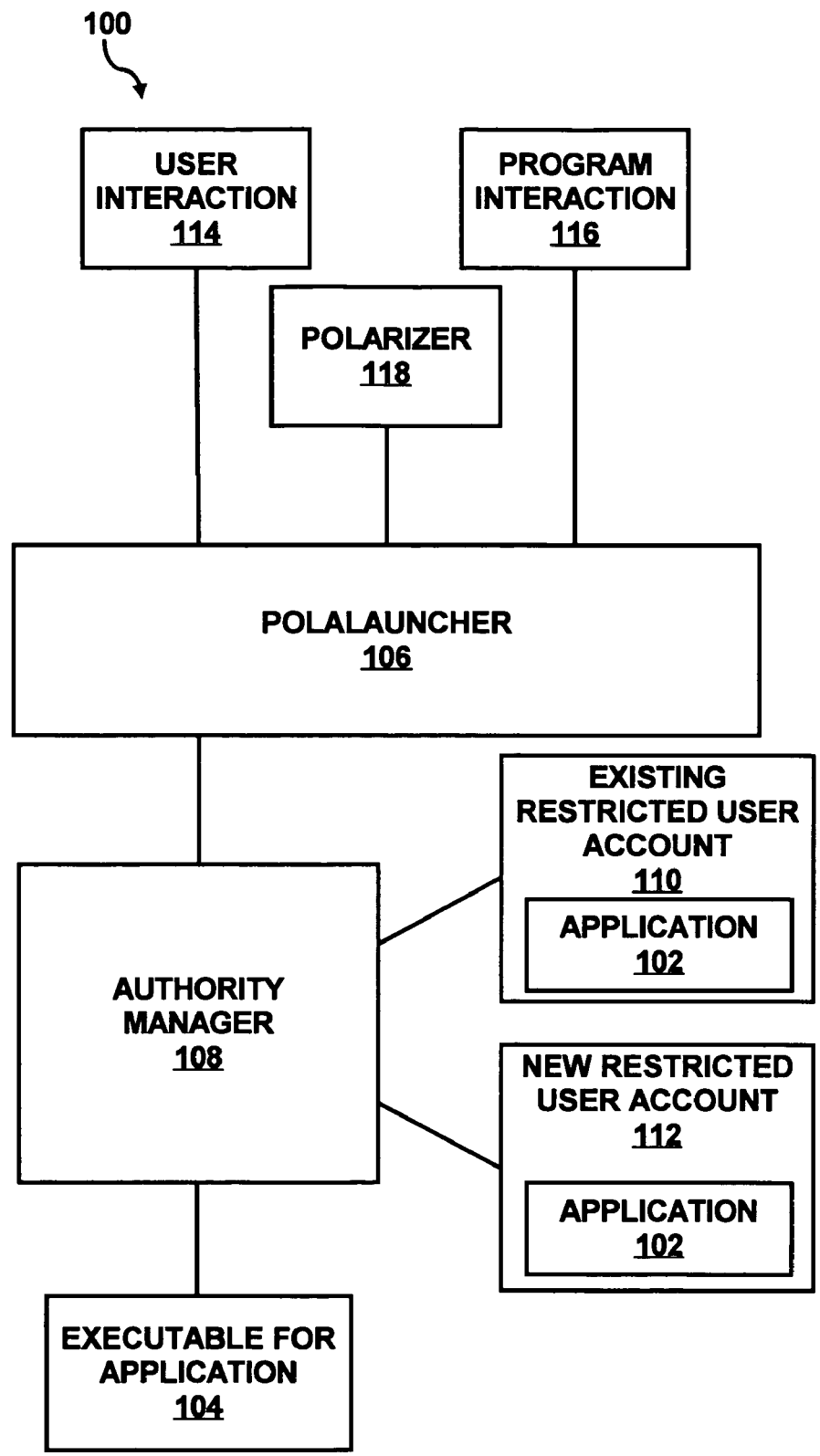
FIG. 1 shows a block diagram of a system for launching an application in a restricted user account in accordance with an embodiment of the invention.

For simplicity and illustrative purposes, the principles of examples of systems and methods is described. In the following description, numerous specific details are set forth in order to provide a thorough understanding of the examples. It will be apparent however, to one of ordinary skill in the art, that the examples may be practiced without limitation to these specific details. In other instances, well known methods and structures have not been described in detail so as not to unnecessarily obscure the examples.

Throughout the present disclosure, reference is made to a restricted user account. The restricted user account may be defined as an account provided with access to fewer resources than the user's login account. A software application, to be confined, runs within the restricted user account. The restricted user account may have authority to access an executable file for the application and any other file necessary to complete a task for the application. For example, the restricted user account, and likewise the application, may have read only access to an executable file which started the application and read/write access to support files or directories containing the support files for running the application.

The restricted user account may be an existing restricted user account with a predetermined set of authorities relevant for the application. The predetermined set of authorities is modifiable to provide flexibility to the system. In addition, a computer system may include a plurality of existing restricted user accounts for various applications.

In another example, the restricted user account may be a new restricted user account created and assigned a predetermined set of authorities for launching the application. Once the new restricted user account is created, an application may run in the new restricted user account and access the same resources that the new restricted user account may access. Once the application terminates, the new restricted user account may be deleted. In some respects, this may be viewed as a "single-use" restricted user account.

Reference is also made to an identifier of an application. Examples of the identifier may include a file name and/or a path name of an executable file used to run the application. The identifier may be an original identifier that is the original file name and/or the path name of the executable file for launching the application. The identifier may also be a new identifier that is the new file name and/or the new path name of the executable file for launching the application.

Reference is also made to a polalauncher. The polalauncher may be defined as an executable file, script, or application configured to run an application within a restricted user account. The polalauncher may be identified with the original identifier of the application. The polalauncher may also be configured to send a request to an authority manager (defined below) to run the application within an existing restricted user account. In another example, the polalauncher may also be configured to send a request to an authority manager to create a new restricted user account and to run the application within the new restricted user account. The polalauncher may also include information relevant to the application such as the new identifier of the application, the existing restricted user account to use for launching the application, and/or a set of authorities with which to create a new restricted user account to use for launching the application.

Reference is also made to an authority manager. The authority manager may be defined as an application or script configured to receive a request from a polalauncher and to run an application, identified by the polalauncher, in a restricted user account. The authority manager may be configured to use one of a plurality of existing restricted user accounts that is designated for the application. In another example, the authority manager may be configured to create a new restricted user account and to delete the new restricted user account when the application terminates.

In an example, a computer system includes an executable file for launching an application; the executable file includes an original identifier. The original identifier is changed to a new identifier while a polalauncher, created for the application, is given the original identifier. The polalauncher is an executable file, program or script configured to send a request to a authority manager to run the application. Whenever a user or another program in the computer system attempts to run the application using the original identifier, the polalauncher runs (and sends a request to a authority manager to run the application in a restricted user account) instead of the application launching in a non-restricted user account. The authority manager receives the request and runs the application, using the new identifier, in a restricted user account.

Access to the application is restricted by hiding the executable file from a user or another program attempting to run the application. This ensures that the application runs in a restricted user account rather than a non-restricted user account, which prevents virus spreading. For example, a user clicks on an e-mail attachment, which contains a "macro" type virus, in an e-mail program. The e-mail program, in response, attempts to run the application associated with attachment but instead runs the polalaucher which then runs the application in a restricted user account thus confining the virus. The virus may try to spread or access other parts of the user's system, however, it will be confined to accessing only those resources available to the restricted user account. If these precautions were not in place, the e-mail program would run the application in a non-restricted user account and the virus may spread throughout the user's entire data space, and often throughout the entire computer system.

In another example, the polalauncher's request includes the new identifier of the executable file for the application (that is, the new identifier of the application) and the particular existing restricted user account to use in order to run the application. The authority manager receives the request and runs the application, using the new identifier, in the existing restricted user account. A plurality of existing restricted user accounts may have been previously created; one for each application in the computer system, each one having a predetermined set of authorities for the application with which it is associated.

In another example, the polalauncher's request includes the new identifier of the executable file for the application and a set of authorities for the application. The authority manager receives the request; creates a new restricted user account using the set of authorities; and runs the application, using the new identifier, in the new restricted user account. Alternatively, the authority manager may use a predetermined set of authorities to create the new restricted user account and modify the predetermined set of authorities according to the set of authorities received in the request from the polalauncher. In either case, when the application terminates, the authority manager may delete the new restricted user account.

In another example, a computer system may be configured such that substantially all executable files for substantially all applications have been provided with new identifiers and polalaunchers have been provided having the applications' original identifiers. In this manner, whenever a user or another program in the computer system attempts to run any application using any one of the original identifiers, the polalauncher runs and sends a request to an authority manager to run the application. Therefore, the user's entire computer system is protected.

With reference first to FIG. 1, there is shown a block diagram of a system 100 for launching an application in a restricted user account. The system 100 includes an application 102, an executable file 104, a polalauncher 106, an authority manager 108, and may include an existing restricted user account 110 and/or a new restricted user account 112. The executable file 104 is for launching the application 102. The polalauncher 106 was created to replace the executable file 104 for the application 102. The polalauncher 106 may be an executable file located in the computer system 100. The polalauncher 106 has an original identifier of the executable file 104, which has a new identifier after polarization. The polalauncher 106 may be executed either from user interaction 114 or program interaction 116. In either case, the polalauncher 106, upon execution, sends a request to the authority manager 108 including the new identifier for the executable file 104 of the application 102.

The system 100 may also include a polarizer 118. The polarizer 118 may be responsible for creating the existing restricted user account 110 and the polalauncher 106. The polarizer 118 may also be responsible for changing the original identifier of the executable file 104 to the new identifier. For example, the polarizer 118 may change a name of "TextEditor.exe" to "TextEditor1.exe" and create a polalauncher having the name "TextEditor.exe." When the user or another application attempts to run "TextEditor.exe," the polalauncher runs and sends the new identifier "TextEditor1.exe" to the authority manager to run the "TextEditor" application.

In one example, the authority manager 108 receives the request and runs the application 102 within the existing restricted user account 110. The existing restricted user account 110 was previously created for the application 102 and provided with a predetermined set of authorities. The polalauncher 106 may also identify the existing restricted user account 110 in the request to the authority manager 108. Alternatively, the authority manager 108 may include a table, database or other data structure for correlating the new or original identifier with the existing restricted user account 110. The authority manager 108 may also be configured to receive a request from a user of the application 102 to access other computer resources and modify the predetermined set of authorities accordingly.

In another example, the authority manager 108 receives the request, creates a new restricted user account 112, and runs the application 102 within the new restricted user account 112. The polalauncher 106 may also send in the request a predetermined set of authorities for creating the new restricted user account 112. In this case, the authority manager 108 uses the predetermined set of authorities to create the new restricted user account 112. Alternatively, the authority manager 108 may include a predetermined set of authorities for creating any new restricted user account and the polalauncher 106 may request a modification of the predetermined set of authorities according to requirements of the application 102. As in the example described above, the authority manager 108 may also be configured to receive a request from a user of the application 102 to access other computer resources and modify the predetermined set of authorities accordingly.

In either example, the polalauncher 106, by having the original identifier of the application 102, provides a failsafe for a user or another program attempting to run the application 102 directly and outside of a restricted user account. Because the original identifier points to the polalauncher 106 and the new identifier points to the executable 104, the user will not accidentally run the application 102 in a non-restricted user account. Additionally, any program attempting to execute the application 102 will instead execute the polalauncher 106 for the application 102. This mechanism ensures that the application 102 runs in a restricted user account.

Figure 2:
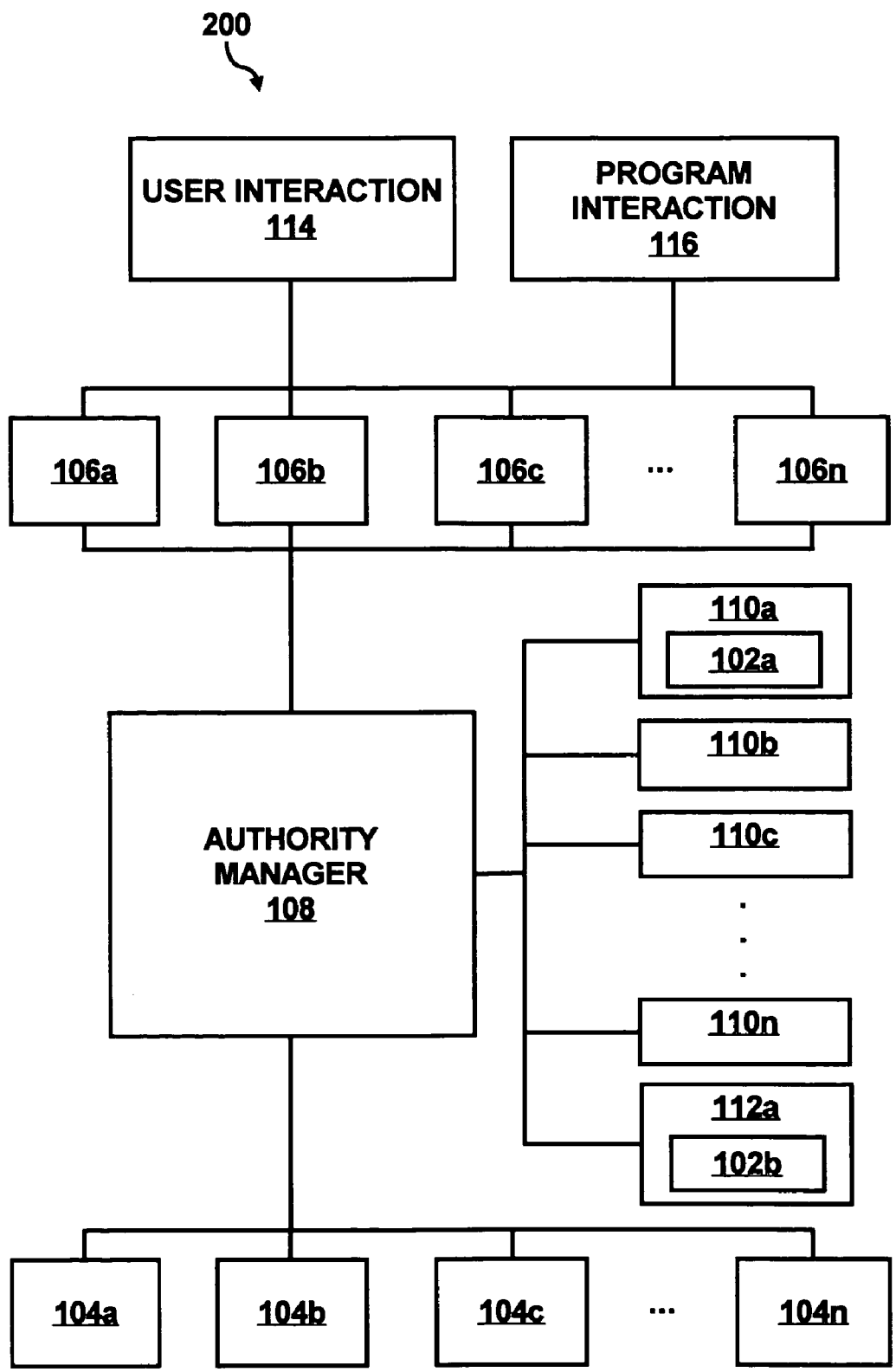
FIG. 2 shows a block diagram of a system for launching an application in a restricted user account in accordance with an another embodiment of the invention.

With reference now to FIG. 2, there is shown a block diagram of a system 200 for launching an application in a restricted user account. The system 200 includes applications 102a and 102b, executable files 104a-104n, polalaunchers 106a-106n, an authority manager 108, and may include existing restricted user accounts 110a-110n and/or a new restricted user account 112a. The executable files 104a and 104b are for launching applications 102a and 102b, respectively. The polalaunchers 106a and 106b were created for the applications 102a and 102b and may be files in the computer system 200 having original identifiers of the executable files 104a and 104b, which both have new identifiers. The polalaunchers 106c-106n were created for the executable files 104c-104n, respectively, of other applications. The polalaunchers 106a-106n may be executed either from user interaction 114 or program interaction 116. In either case, any of the polalaunchers 106a-106n, upon execution, sends a request to the authority manager 108 including the new identifier for the corresponding executable file 104a-104n.

In one example, the authority manager 108 receives the request from the polalauncher 106a and runs the application 102a within the existing restricted user account 110a. The existing restricted user account 110a was previously created for the application 102a and provided with a predetermined set of authorities. The polalauncher 106a may also identify the existing restricted user account 110a in the request to the authority manager 108. Alternatively, the authority manager 108 may include a table, database or other data structure for correlating the new or original identifier with the existing restricted user account 110a. The authority manager 108 may also be configured to receive a request from a user of the application 102a to access other computer resources and modify the predetermined set of authorities accordingly.

In another example, the authority manager 108 receives the request from polalauncher 106b, creates a new restricted user account 112a, and runs the application 102b within the new restricted user account 112a. The polalauncher 106b may also send in the request a predetermined set of authorities for creating the new restricted user account 112a. In this case, the authority manager 108 uses the predetermined set of authorities to create the new restricted user account 112a. Alternatively, the authority manager 108 may include a predetermined set of authorities for creating any new restricted user account and the polalauncher 106b may request a modification of the predetermined set of authorities according to requirements of the application 102b. As in the example described above, the authority manager 108 may also be configured to receive a request from a user of the application 102b to access other computer resources and modify the predetermined set of authorities accordingly.

Although the above examples show two applications, it should be noted that any number of applications may be run in one of any plurality of existing restricted user accounts or any new existing restricted user account with the system 200. Furthermore, any number of executable files may have any number of corresponding polalaunchers. The letters "a-n" used above is meant to include from one to an infinite number of possible occurrences of executable files, polalaunchers, existing restricted user accounts, and new restricted user accounts.

When the system 200 is employed in this manner, the predetermined set of authorities for each restricted user account may include permission to access folders or areas having other polalaunchers such that an application running in one restricted user account may run another application. In an example of this configuration, each existing restricted user account 102a-102n and each new restricted user account 112a-112n may have at least read-only permission to polalaunchers 106a-106n. This provides additional flexibility to the system 200. For instance, a user may be using an e-mail application running in a restricted use account. The user receives an e-mail with a text file attachment. The user double clicks on the text file attachment and the e-mail application in conjunction with the operating system attempts to run the application associated with ".txt" files. If the predetermined set of authorities did not include access to the polalauncher for the application associated with the ".txt" file, the e-mail application would return an error to the user. Therefore, the predetermined set of authorities may include access to resources, folders, or areas having the polalauncher for the application associated with ".txt" files.

Figure 3:
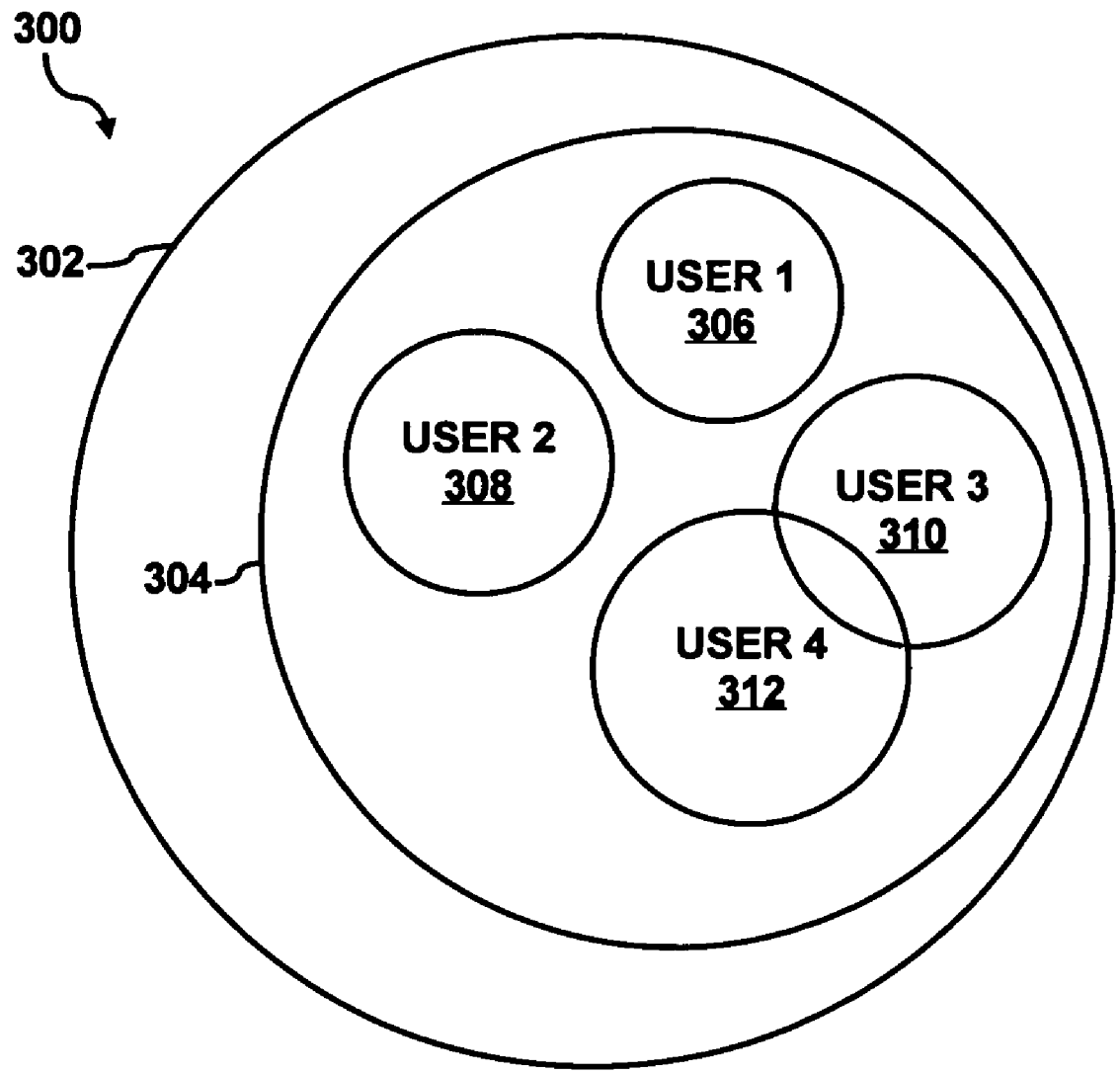
FIG. 3 shows a Venn diagram of user accounts in accordance with an embodiment of the invention.

With reference now to FIG. 3, there is shown a Venn diagram 300 of a user account and restricted user accounts in accordance with an example of a computer system. An administrative account 302 may have access to all resources available in a computer system while a user account 304 may have access to all resources available to that particular user. User accounts, such as user account 304, typically have access to fewer resources than the administrative account 302. However, many user accounts may have access to all resources available in a computer system thus increasing the need for additional protections. The Venn diagram 300 also includes four smaller circles representing four restricted user accounts 306-312 having access to a predetermined set of resources. The first restricted user account 306 has access to the fewest number of resources. For example, the first restricted user account 306 may have access to a single executable file or application. The second restricted user account 308 has access to more resources while the third restricted user account 310 has access to even more resources. In the Venn diagram 300, the forth restricted user account 312 has access to the most systems resources although access is limited to a subset of the resources available to the user which itself is a subset of resources available in the computer system.

The system resources may be designated by the administrator of the system. For example, the administrator may determine that a particular user needs access to all text files in certain folders but should not have access to any files containing financial information while an administrator of a company should have access to any file containing financial information but not have access to any file containing confidential client information. The administrator may designate permissions to user accounts accordingly.

One of ordinary skill in the art would recognize that the any number of restricted user accounts may be created having a plurality of possible permission settings. Additionally, multiple restricted user accounts may be designated for multiple instances of the same application. That is multiple instances of one application may be simultaneously running on the same computer system. For example, a first instance may be started by a user double-clicking on an icon for the application, and while the first instance is running, the user may double-click on the icon again which starts a second instance of the application. Each instance runs in its own restricted user account which can limit the spread of viruses within a computer system.

In one example, the restricted user accounts 306-312 may be accounts for the same user of the user account 304. However, the restricted user accounts 306-312 were created to run the applications described above in an environment where the applications have access to limited resources instead of all the resources of the user account 304. Thus, a virus infecting any of the applications is substantially confined to the resources available to the infected application.

This manner of protection a computer system from virus spreading may be referred to as the principle of least authority (hereinafter referred to as POLA). POLA may be implemented by controlling an application's access to resources within a computer system. POLA, in general, gives a person or thing the least authority it needs to perform a task. By implementing POLA in the computer system, the system controls an application's access, through controlling access permissions, to resources within the computer system. In one example, the system may control an application's access to the resources such that the application may have access to only the executable file needed to run the application and any other file necessary to complete a task. By controlling the access to resources, the computer system can be shielded from an application infected with a virus. One example of limiting an application's permissions to resources may include creating a restricted user account and confining the application to run within the restricted user account.

Figure 4:
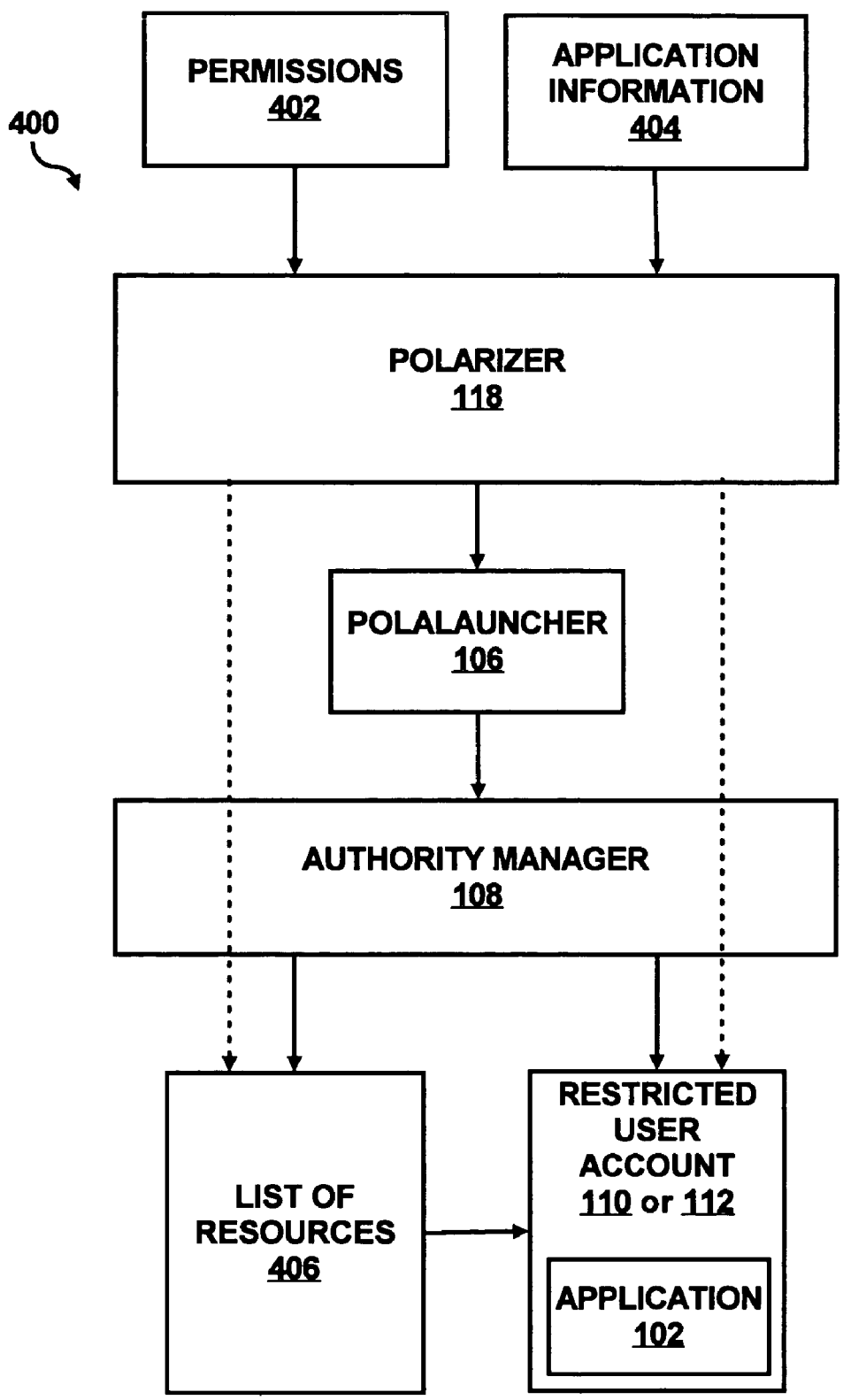
FIG. 4 shows a block diagram of a system for launching an application in a restricted user account in accordance with another embodiment of the invention.

Referring now to FIG. 4, there is shown a block diagram of a system 400 for launching an application within a restricted user account. The system 400 includes a polarizer 118 for accepting as inputs a predetermined set of authorities 402 and application information 404. The predetermined set of authorities 402 may be input by a user selecting a resource or resources that will be available to the application 102 through the existing restricted user account 110 or the new restricted user account 112. The application information 404 may include the name and/or path of the executable file 104 for the application 102. The polarizer 118 accepts the permissions 402 and application information 404 and creates a polalauncher 106 for the application 102 having the original identifier of the executable 104. Additionally, the polarizer 118 moves or renames the executable 104 such that it is available using a new identifier, which is also provided to the polalauncher 106.

In one example, the polarizer 118 creates the existing restricted user account 110 using the predetermined set of authorities 402. In another example, the polarizer 118 provides the predetermined set of authorities 402 (or instructions to modify the predetermined set of authorities in the authority manager 108) to the polalauncher 106. The polalauncher 106 includes this information when sending the request to the authority manager 108 that then creates the new restricted user account 112 upon request.

The polarizer 118 or authority manager 108 may create the existing restricted user account 110 or the new restricted user account 112, respectively, by composing a set of resources available to a particular restricted user account. This may be implemented through an access control list attached to a particular resource. The access control list is a list attached to a single resource that lists the user accounts that can access the single resource. The access control list may be populated or edited using a list of resources 406 as shown in FIG. 4. The list 406 of resources may be stored in a table, database or any data structure. One of ordinary skill in the art would recognize that the list of resources may be stored in a variety of manners.

FIG. 5 shows a flow diagram of an operational mode 500 of an example of a system for launching an application in a restricted user account. The following description of the operational mode 500 is made with reference to the system 100 illustrated in FIG. 1, and thus makes reference to the elements cited therein. The following description of the operational mode 500 is one manner in which the system 100 may be implemented. In this respect, it is to be understood that the following description of the operational mode 500 is but one manner of a variety of different manners in which such a system may be operated.

In the operational mode 500, the polarizer 118 changes the original identifier of the executable 104 for the application 102 to the new identifier at step 502. In an attempt to run the application 102 using the original identifier, the authority manager 108 runs the application 102 in a restricted user account using the new identifier of the application 102 at step 504.

Figure 6:
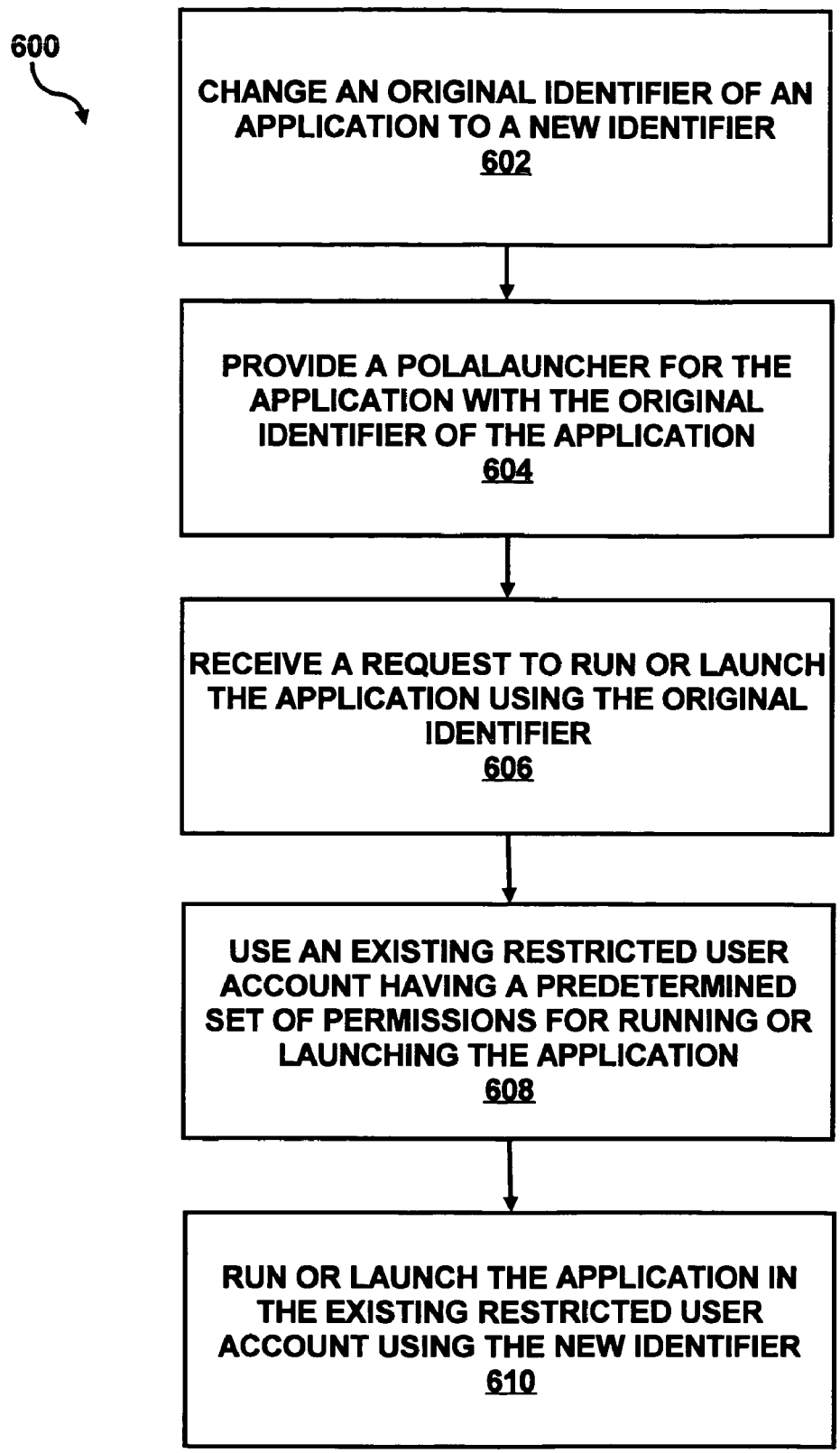
FIG. 6 shows a flow diagram of an operational mode of a system for launching an application in a restricted user account in accordance with another embodiment of the invention.

FIG. 6 shows a flow diagram of an operational mode 600 of another example of a system for launching an application in a restricted user account. The following description of the operational mode 600 is made with reference to the system 100 illustrated in FIG. 1, and thus makes reference to the elements cited therein. The following description of the operational mode 600 is one manner in which the system 100 may be implemented. In this respect, it is to be understood that the following description of the operational mode 600 is but one manner of a variety of different manners in which such a system may be operated.

In the operational mode 600, the polarizer 118 changes the original identifier of the executable file 104 for the application 102 to the new identifier at step 602. The polarizer 118 also provides the polalauncher 106 for the application 102 with the original identifier of the executable file 104 for the application 102 at step 604. The authority manager 108 receives a request, including the new identifier, to run the application 102 from the polalauncher 106 at step 606. The request instructs the authority manager 108 to use the existing restricted user account 110 at step 608. The authority manager 108 then runs the application 102 in the existing restricted user account 110 using the new identifier of the application 102 at step 610.

Figure 7:
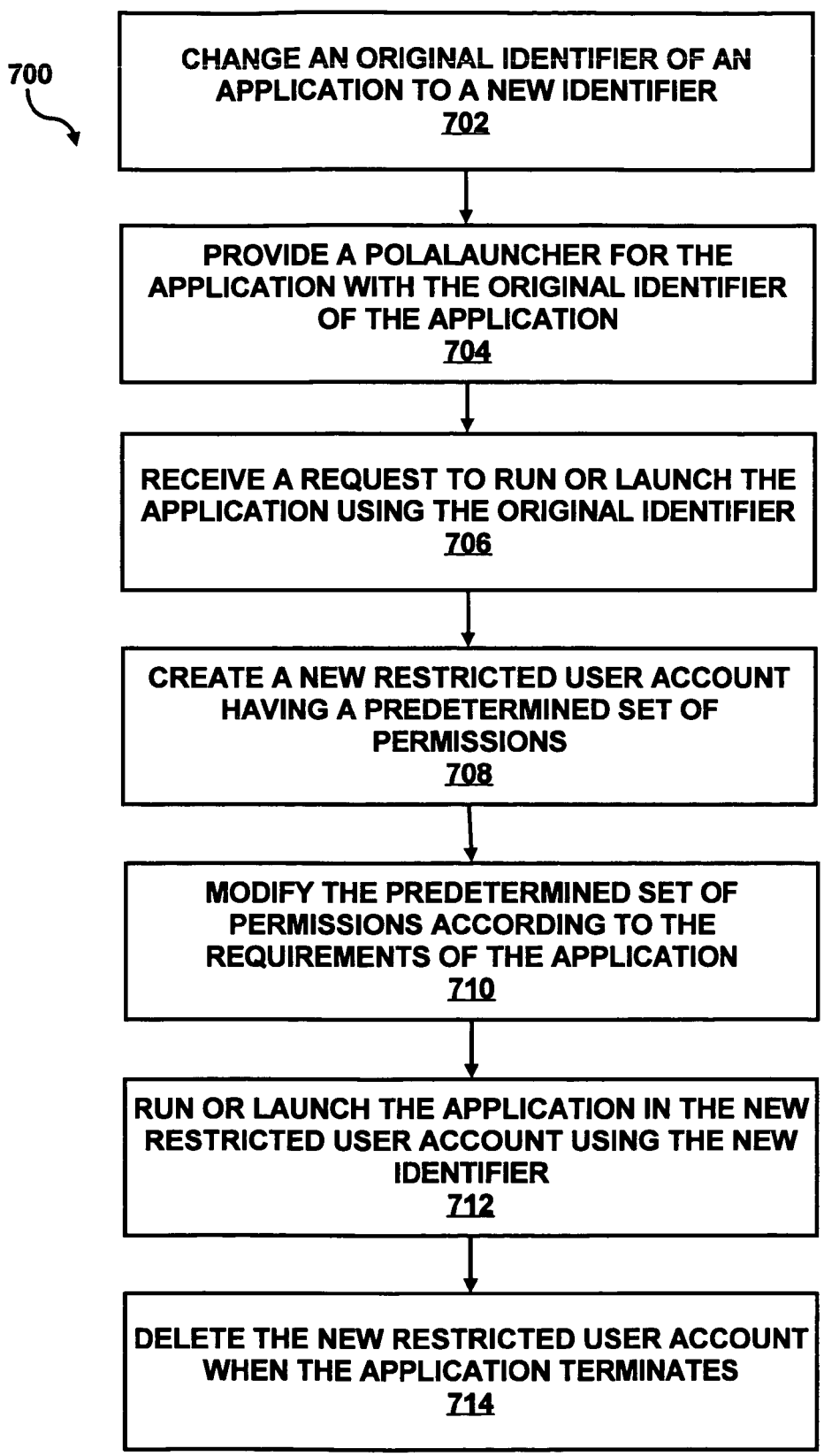
FIG. 7 shows a flow diagram of an operational mode of a system for launching an application in a restricted user account in accordance with another embodiment of the invention.

FIG. 7 shows a flow diagram of an operational mode 700 of another example of a system for launching an application in a restricted user account. The following description of the operational mode 700 is made with reference to the system 100 illustrated in FIG. 1, and thus makes reference to the elements cited therein. The following description of the operational mode 700 is one manner in which the system 100 may be implemented. In this respect, it is to be understood that the following description of the operational mode 700 is but one manner of a variety of different manners in which such a system may be operated.

In the operational mode 700, the polarizer 118 changes the original identifier of the executable file 104 for the application 102 to the new identifier at step 702. The polarizer 118 also provides the polalauncher 106 for the application 102 with the original identifier of the executable file 104 for the application 102 at step 704. The authority manager 108 receives a request, including the original identifier, to run the application 102 from the polalauncher 106 at step 706. The authority manager 108, in response to the request, creates the new restricted user account 112 having a predetermined set of authorities at step 708.

In one example, the authority manager 108 includes the list of resources 406 having therein the predetermined set of authorities. The request may then include an instruction to modify the predetermined set of authorities according to the requirements of the application. Accordingly, the authority manager 108, in response to the request, modifies the predetermined set of authorities according to the requirements of the application at step 710. In another example, the authority manager 108 receives the predetermined set of authorities from the request sent by the polalauncher 106 and therefore step 710 is optional.

The authority manager 108 then runs the application 102 in the new restricted user account 112 using the new identifier of the application 102 at step 712. When the application 102 terminates, the authority manager 108 deletes the new restricted user account 112 at step 714.

Figure 8:
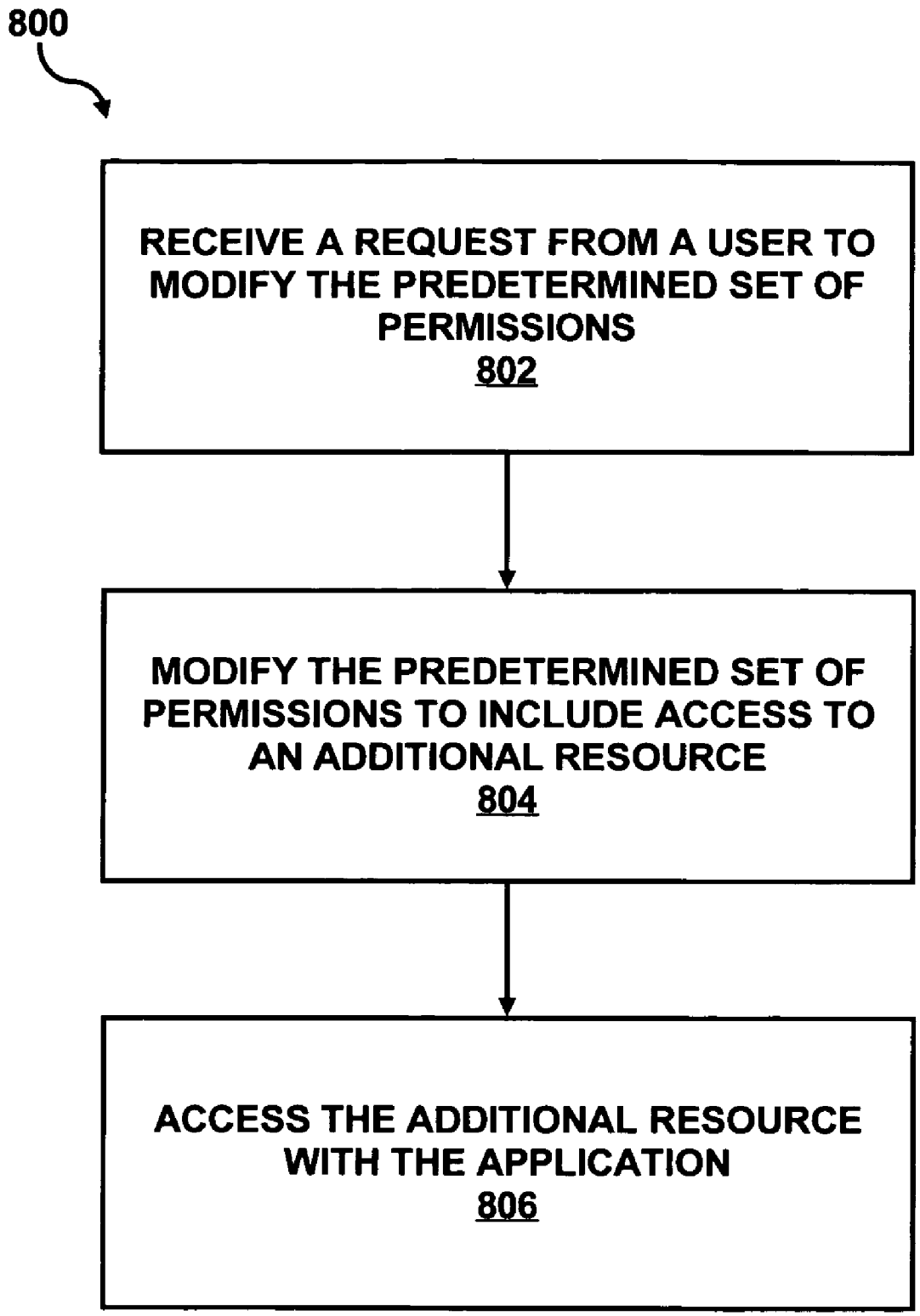
FIG. 8 shows a flow diagram of an operational mode of a system for launching an application in a restricted user account in accordance with another embodiment of the invention.

FIG. 8 shows a flow diagram of an operational mode 800 of another example of a system for launching an application in a restricted user account. The following description of the operational mode 800 is made with reference to the system 100 illustrated in FIG. 1, and thus makes reference to the elements cited therein. The following description of the operational mode 800 is one manner in which the system 100 may be implemented. In this respect, it is to be understood that the following description of the operational mode 800 is but one manner of a variety of different manners in which such a system may be operated.

In the operational mode 800, the authority manager 108 receives a request to modify the predetermined set of authorities available to the application 102 in order to access an additional resource at step 802. The authority manager 108 confers upon the restricted user account 104 the authority to access the resource at step 804, possibly by modifying the access control list, using the list of resources 406 or directly, to include the restricted user account 104, possibly by creating a synchronized copy, or by other means appropriate to the specific nature of the resource. The application 102 accesses the additional resource at step 806.

Figure 9:
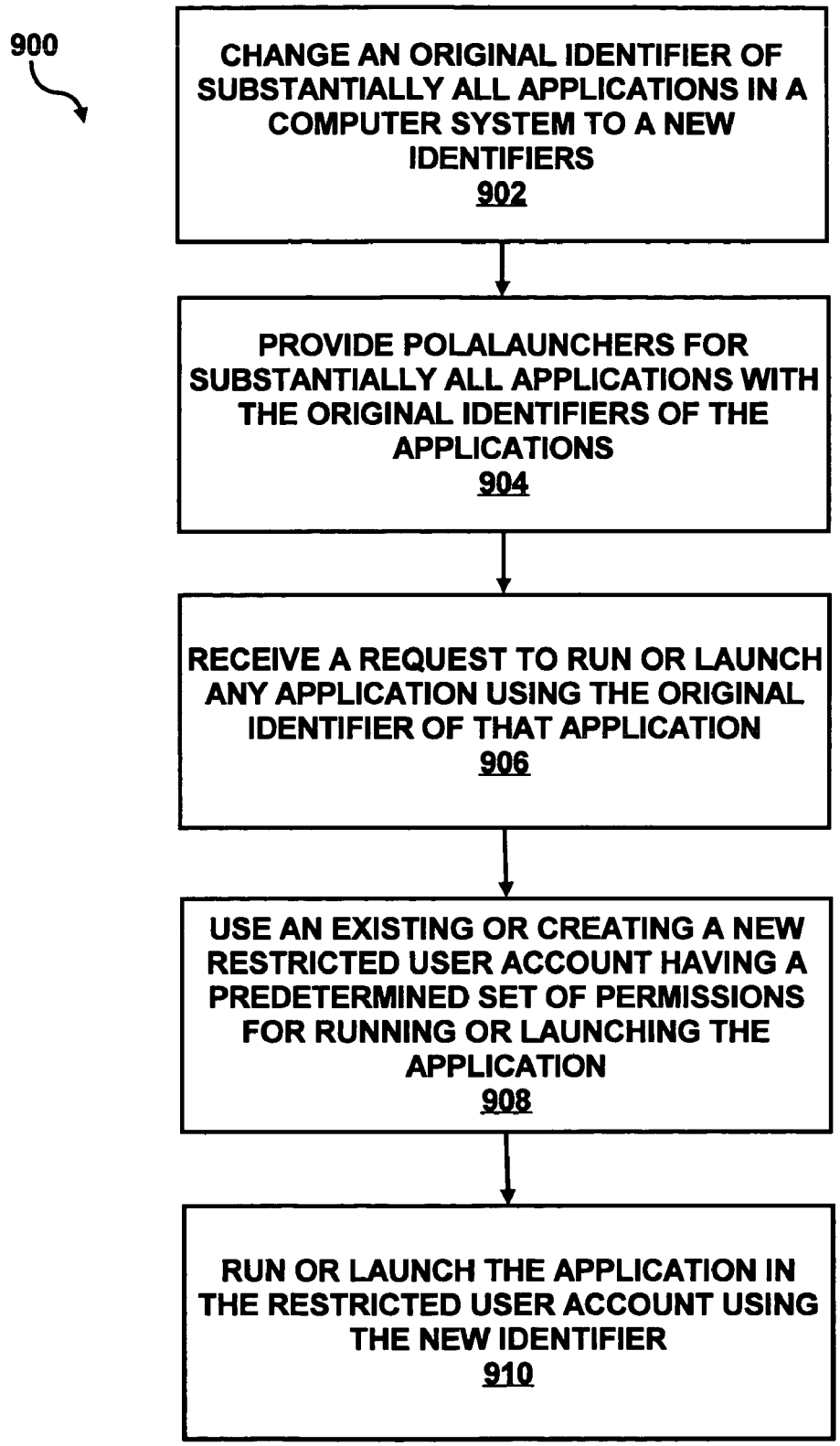
FIG. 9 shows a flow diagram of an operational mode of a system for launching an application in a restricted user account in accordance with another embodiment of the invention.

FIG. 9 shows a flow diagram of an operational mode 900 of another example of a system for launching an application in a restricted user account. The following description of the operational mode 900 is made with reference to the systems 100 and 200 illustrated in FIGS. 1 and 2, respectively, and thus makes reference to the elements cited therein. The following description of the operational mode 900 is one manner in which the systems 100 and 200 may be implemented. In this respect, it is to be understood that the following description of the operational mode 900 is but one manner of a variety of different manners in which such systems may be operated.

In the operational mode 900, the polarizer 118 changes the original identifier of substantially all the executable files 104a-104n for the applications 102a-102n in the computer system 200 to the new identifier at step 902. The polarizer 118 also provides the polalaunchers 106a-106n for substantially all the applications in the computer system 200 with the original identifiers of the executable files 104a-104n at step 904. The authority manager 108 receives a request, including the original identifier, to run any of the applications from one of the polalaunchers 106a-106n at step 906. The authority manager 108, in response to the request, creates the new restricted user account 112a having a predetermined set of authorities or uses one of the existing restricted user accounts 110a-110n having a predetermined set of authorities at step 908 and runs any one of the applications at step 910.

Some of the steps illustrated in the process flow or operational mode 300 may be contained as a utility, program, subprogram, in any desired computer accessible medium. In addition, the operational mode 300 may be embodied by a computer program, a plurality of computer programs or any other non-transitory computer readable media, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable non-transitory computer readable media or storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Figure 10:
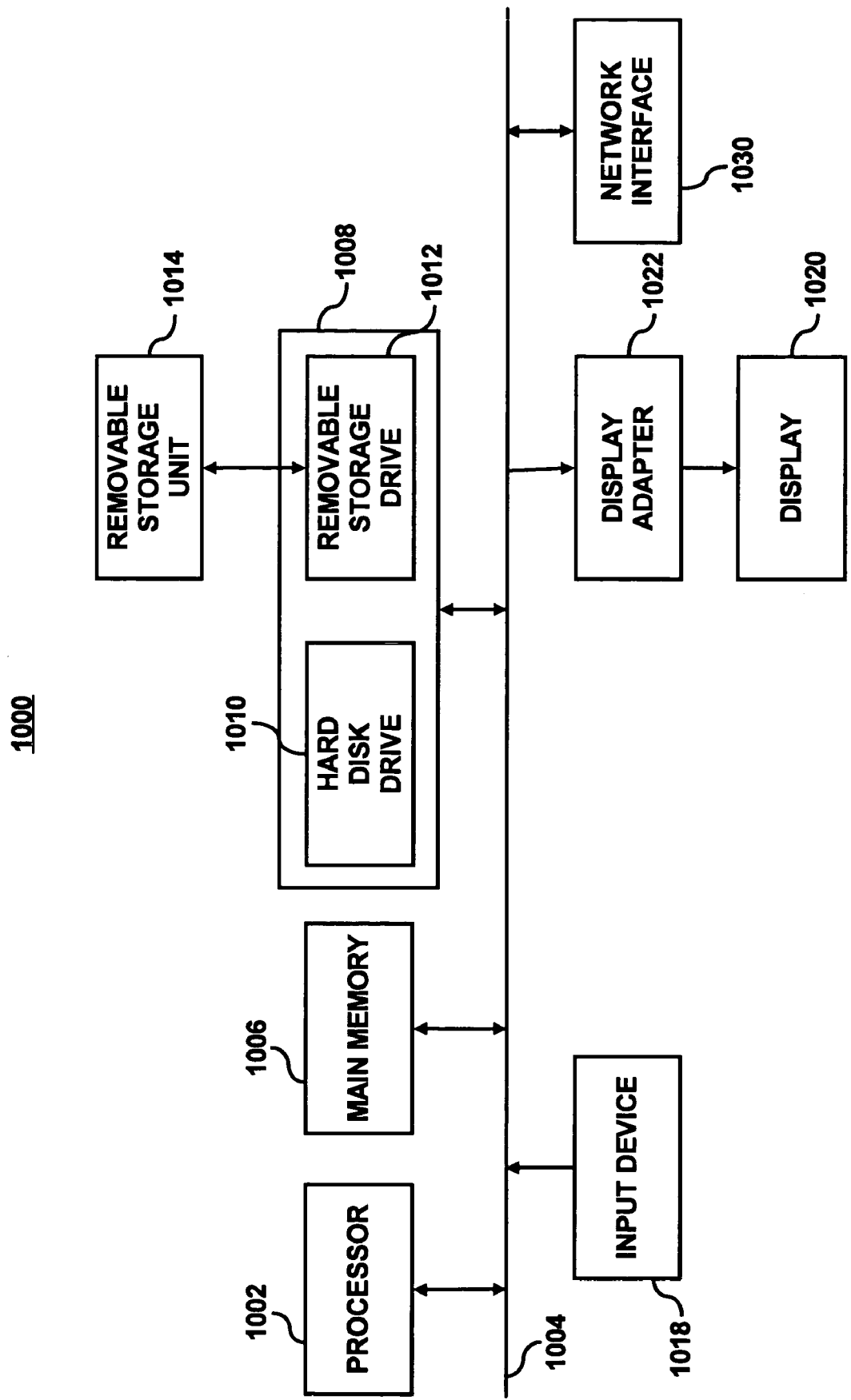
FIG. 10 shows a schematic diagram of a computer system in which embodiments of the invention may be implemented.

FIG. 10 illustrates an exemplary block diagram of a computer system 1000 that may run the application 102 shown in FIG. 1. The computer system 1000 includes one or more processors, such as processor 1002, providing an execution platform for executing software, such as the application 102, the polalauncher 106, the authority manager 108, and the polarizer 118. The processor 1002 may also execute an operating system (not shown) for executing the software in addition to performing operating system tasks.

Commands and data from the processor 1002 are communicated over a communication bus 1004. The computer system 1000 also includes a main memory 1006, such as a Random Access Memory (RAM), where software may be executed during runtime, and a secondary memory 1008. The secondary memory 1008 includes, for example, a hard disk drive 1010 and/or a removable storage drive 1012, representing a floppy diskette drive, a magnetic tape drive, a compact disk drive, etc., or a nonvolatile memory where a copy of the software may be stored. Applications and some resources, such as files, may be stored in the secondary memory 1008 and transferred to the main memory 1006 during run time. Additionally, the application 102, the executables 104, and the polalaunchers 106, shown in FIG. 1, may be stored in the same manner. The secondary memory 1008 may also include ROM (read only memory), EPROM (erasable, programmable ROM), EEPROM (electrically erasable, programmable ROM).

A user interfaces with the computer system 1000 with one or more input devices 1018, such as a keyboard, a mouse, a stylus, and the like. The display adaptor 1022 interfaces with the communication bus 1004 and the display 1020 and receives display data from the processor 1002 and converts the display data into display commands for the display 1020. The user interacts with the application 102 through the use of the input devices 1018 and display 1020. A network interface 1030 is provided for communicating with other nodes including the alert computer 116 via a network.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A method of launching an application in a computer system, the method comprising:
changing an original identifier of the application in the computer system to a new identifier;
creating a restricted user account having a predetermined set of authorities in response to a request to run the application, wherein the restricted user account is an account with access to fewer resources of the computer system than a login account for the user; and launching the application in the restricted user account using the new identifier of the application in response to an attempt to run the application using the original identifier.

2. The method of claim 1 further comprising:

deleting the restricted user account after the application terminates.

3. The method of claim 1 further comprising:

modifying the set of authorities according to requirements of the application.

4. The method of claim 1 further comprising:

modifying the set of authorities according to a user's request.

5. The method of claim 1 further comprising:

providing a polalauncher with the original identifier of the application; and sending a request, including the new identifier, from the polalauncher to run the application.

6. The method of claim 5 further comprising:

providing polalaunchers for substantially all applications in the computer system.

7. A method of launching an application in a restricted user account, the method comprising:

changing an original identifier of the application to a new identifier;

creating a polalauncher identified with the original identifier of the application;

sending a request, including the new identifier, from the polalauncher to an authority manager to run the application in the restricted user account;

creating the restricted user account having a predetermined set of authorities in response to the request to run the application, wherein the restricted user account is an account with access to fewer resources of the computer system than a login account for the user; and using the restricted user account for launching the application.

8. The method of claim 7 further comprising:

modifying the predetermined set of authorities of the new restricted user account according to requirements of the application.

9. The method of claim 7 further comprising:

modifying the predetermined set of authorities of the new restricted user account according to a user's request.

10. The method of claim 7, wherein the computer system includes a plurality of applications and further comprising:

changing original identifiers for substantially all of the plurality of applications on the computer system to new identifiers; and providing multiple polalaunchers, one for each of the substantially all of the plurality of applications.

11. A non-transitory computer readable medium on which is embedded one or more computer programs, said one or more computer programs implementing a method for launching an application in a restricted user account, said one or more computer programs comprising a set of instructions for:

changing an original identifier of the application to a new identifier;

receiving a request to run the application with the original identifier; sending the request, including the new identifier, to an authority manager;

creating the restricted user account having a predetermined set of authorities in response to the request to run the application, wherein the restricted user account is an account with access to fewer resources of the computer system than a login account for the user; and launching the application in the restricted user account using the authority manager.

12. The non-transitory computer readable medium according to claim 11, the one or more computer programs further comprising a set of instructions for:

deleting the restricted user account after the application terminates.

13. The non-transitory computer readable medium according to claim 12, the one or more computer programs further comprising a set of instructions for:

modifying the predetermined set of authorities of the restricted user account.

14. A computer system comprising:

a memory; and a processor coupled to the memory;

wherein the processor is configured to perform the steps of:

changing an identification of an application within a computer system from an original identification to a new identification;

requesting use of the application;

creating a restricted user account having a predetermined set of authorities in response to the request to run the application, wherein the restricted user account is an account with access to fewer resources of the computer system than a login account for the user; and launching the application in the restricted user account using the new identification in response to a request to launch the application using the original identification of the application.

15. The computer system of claim 14 wherein the processor is further configured to perform the step of modifying a predefined set of authorities of the restricted user account.

16. A computer system comprising:

an application;

a new identifier of the application;

a polalauncher identified to the computer system as the application, the polalauncher configured to send a request to run the application; and an authority manager configured to receive the request from the polalauncher and configured to run the application in a restricted user account, wherein the authority manager is further configured to create the restricted user account with a predetermined set of authorities in response to the request and the restricted user account is an account with access to fewer resources of the computer system than a login account for the user; wherein the polalauncher is further configured to send the new identifier to the authority manager.

17. The computer system of claim 16, wherein the authority manager is further configured to modify the predetermined set of authorities.

* * * * *